Figure 1:
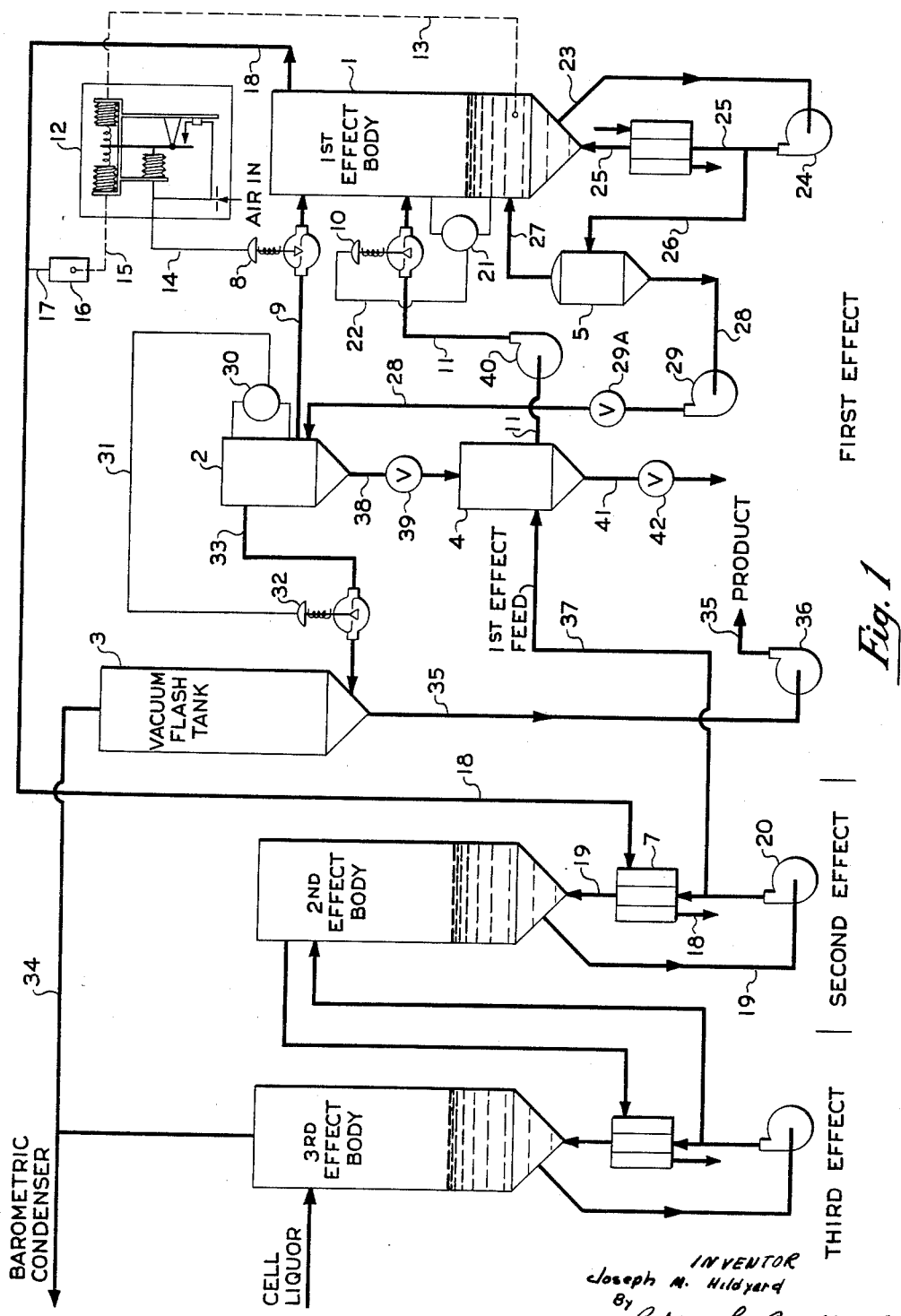

INVENTOR
Joseph M. Hildyard
By
Peter A. Casella
Agent

Sept. 4, 1962  J. M. HILDYARD  3,052,289
EVAPORATION CONTROL METHOD
Filed Aug. 14, 1958  4 Sheets-Sheet 4

INVENTOR
Joseph M. Hildyard
By
Peter J. Casella
Agent

United States Patent Office 3,052,289
Patented Sept. 4, 1962

3,052,289
EVAPORATION CONTROL METHOD
Joseph M. Hildyard, Youngstown, N.Y., assignor to Hooker Chemical Corporation, Niagara Falls, N.Y., a corporation of New York
Filed Aug. 14, 1958, Ser. No. 755,011
11 Claims. (Cl. 159—47)

The present invention relates to a method of and an arrangement for regulating evaporators and like apparatus. More particularly, this invention relates to a method of and an instrumentation arrangement for regulating multiple-effect evaporators having a multiplicity of side streams or recycles used in the concentration of liquids used in industries such as the chloralkali industry and the sugar industry.

There are cases in which the ordinary method of regulating the fluid supply to an evaporator or like apparatus involves certain difficulties in obtaining a stabilized process owing to the time lag between the initiation of a certain regulating actuation and the achievement of the desired result. If, for instance, the temperature or the concentration of a substance in an evaporator body is too low, certain valve means may be actuated in order to balance the flow of fluids going to and from the evaporator to the available heat energy supplied to the evaporator body. The effect of this balance of flow is to cause a longer residence time of the evaporator contents to the supply of heat energy. This balancing actuation normally continues until the desired result is obtained, that is, in the present instance until a predetermined concentration of the substance to be heated within the evaporator body is reached. Owing to the liquid inventory capacity and storage effects existent in the evaporator body and the vessels to which it is connected by recycle side streams, there exists a time lag, that is, a comparatively long time between the initiation of a certain regulating actuation and the accomplishment of the desired result, whereby "over and under" regulation occurs.

An object of my invention is to provide an improved method of and an arrangement for regulating such evaporators whereby "over and under" regulation is substantially reduced consistent with providing certain desirable start-up characteristics of the process.

Another object of this invention is to achieve a more uniform and higher quality final product.

I have now found an improved method of, and an arrangement for, regulating multiple-effect evaporators having a multiplicity of side streams or recycles. Among these side streams are two conduits for supplying fluids to an evaporator body, the first conduit supplying a first fluid of greater concentration than the second and wherein valve means are provided in the conduits for regulating the admission of the fluids to be concentrated. Further, a third conduit, wherein heat energy has been transferred to the contained third fluid, supplies this third fluid to the evaporator to be concentrated. This fluid is substantially the same as the evaporator body contents. A fourth conduit provides the means for discharging generated vapor from the evaporator body. There is also a fifth conduit for discharging concentrated fluid from the evaporator body. A concentration responsive means, such as a temperature difference controller, actuates the valve in the first conduit supplying the first fluid of greater concentration.

Figure 2:
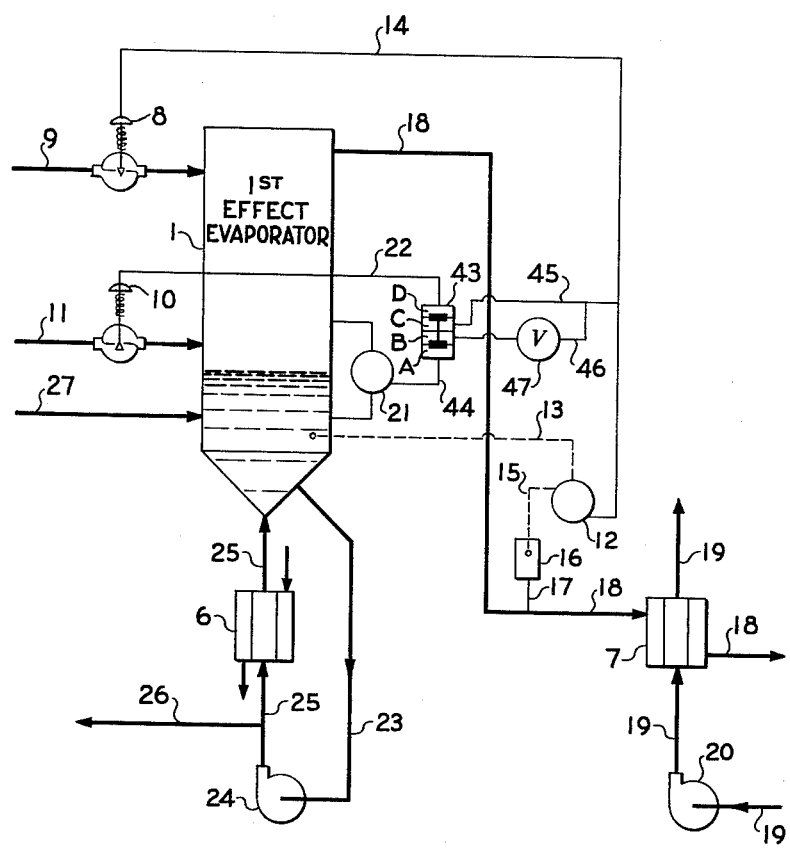

In order that this invention may be more easily understood, it will be described with reference to the attached drawings. FIGURE 1 illustrates a digarammatic flow sheet of an embodiment embraced within the scope of this invention specifically used in the evaporation of cell liquor obtained from the electrolysis of brine. FIGURE 2 illustrates a diagrammatic flow sheet of a preferred embodiment embraced within the scope of this invention.

Referring to FIGURE 1, showing a counter current triple-effect evaporating system: 1 is a first-effect evaporator body of a triple-effect evaporating system. 2 is a first-effect receiver for receiving material concentrated in the first-effect evaporator body 1. 3 is a vacuum flash tank receiving a portion of the decanted material from the first-effect receiver 2. 4 is a second-effect receiver which receives material concentrated in the second-effect evaporator body and slurry from the first-effect receiver 2 and feeds the decanted material to the first-effect evaporator body 1, the salt being fed to the third-effect receiver or other vessel (not shown). 5 is a first-effect salt separator which partially decants material from the first-effect evaporator body 1, returning the liquid to the evaporator body 1 and the slurry to the first-effect receiver 2. 6 is a steam chest which supplies the heat energy to the material in the first-effect evaporator body 1. 7 is the steam chest of a second-effect evaporator and receives vapor evaporated from the first-effect evaporator body 1. 8 is a controlled valve returning a portion of the fluid from the first-effect receiver 2 through line 9 to the first-effect evaporator body 1. 10 is a controlled valve feeding the fluid from the second-effect receiver 4 through line 11 to the first-effect evaporator body 1. 12 is a concentration controller utilizing temperature differences as a measure of concentration. Line 13 is a lead from the concentration controller 12 connected to a temperature element within the body of the first-effect evaporator 1. Line 14 is a lead from the concentration controller 12 connected to the controlled valve 8. Line 15 is a lead from the concentration controller 12 connected to a temperature element located in a desuperheating chamber 16 which in turn is connected by line 17 to the first-effect vapor line 18 leading from the first-effect evaporator body 1 to the second-effect steam chest 7. The function of the desuperheater 16 is to obtain the saturation condition of the vapor at the operating pressure of the evaporator 1 and thereby establish a reference temperature whereby the boiling point rise of the liquid in the evaporator body 1 can be measured. Line 22 is a lead from a level controller 21 connected to the controlled valve 10.

Material from the second-effect evaporator body is recirculated through line 19 and pump 20. Concentrated material from the first-effect evaporator 1 is recirculated through line 23 by pump 24. A portion of this stream is returned to the first-effect evaporator body 1 through the steam chest 6 and line 25. The remaining portion is passed through line 26 to the first-effect salt separator 5. The fluid material of this separator 5 is returned through line 27 to the first-effect evaporator body 1. The slurry from the separator 5 is removed through line 28 and pump 29 and controlled by a valve 29a to the first-effect receiver 2. The slurry from the separator 5 is further separated in the first-effect receiver 2 into a liquor layer and a heavy salt slurry. The heavy salt slurry is fed through line 38 and valve 39 to the second-effect receiver 4. The liquor level of the first-effect receiver 2 is controlled by a level controller 30 which is connected through line 31 to a controlled valve 32 in a liquor line 33 withdrawing clarified material from the first-effect receiver 2 and delivering it to the vacuum flash tank 3. Line 34 connects with a barometric condenser (not shown). The product is removed through line 35 and pump 36. Material (labeled "1st Effect Feed) from the second-effect evaporator is passed through line 37 to the second-effect receiver 4.

My method of control for the system of FIGURE 1 is as follows. If, for instance, the concentration starts to rise within the body of evaporator 1 there results an increase in the temperature of the body liquid and in the temperature difference between the thermal elements at the ends of leads 13 and 15 of controller 12. The control action is arranged so that this increase in temperature difference restricts further the flow of fluid through valve 8. When valve 8 is restricted, the level in receiver 2 starts to rise and level controller 30 opens valve 32 to lower the risen level in receiver 2. This simultaneously increases the product flow rate. The restriction of valve 8 also causes the level in evaporator 1 to fall and level controller 21 opens valve 10 to increase the feed rate to the evaporator body 1. The increase in the rate of product removal, coupled with the increase in feed rate to the evaporator body 1 causes the fluid in the first-effect evaporator body 1 to boil at a lower temperature and return its temperature difference and concentration to the predetermined set point.

Referring to FIGURE 2; 1 is the first-effect evaporator body of a triple-effect evaporator system. 6 is a steam chest which supplies the heat energy to the material in the first-effect evaporator body 1. 7 is the steam chest of a second-effect evaporator body (shown in FIGURE 1) and receives vapor from the first-effect evaporator body 1. 8 is a controlled valve recirculating the fluid from the first-effect receiver 2 (shown in FIGURE 1) through line 9 to the first-effect evaporator body 1. 10 is a controlled valve feeding the fluid from the second-effect receiver 4 (shown in FIGURE 1) through line 11 to the first-effect evaporator body 1. 12 is a concentration controller utilizing temperature differences as a measure of concentration. Line 13 is a lead from the concentration controller 12 connected to a temperature element within the body of the first-effect evaporator 1. Line 14 is a lead from the concentration controller 12 connected to a control valve 8 and the chamber C of a relay or totalizer 43 through line 45. Line 15 is a lead from the concentration controller 12 to the temperature element in a desuperheating chamber 16 which in turn is connected by line 17 to the first-effect vapor line 18 leading from the first-effect evaporator body 1 to the second-effect steam chest 7. Material for the second-effect evaporator (shown in FIGURE 1) passes through line 19 and pump 20 to the second-effect evaporator body. Concentrated material is removed from the first-effect evaporator body 1 through line 23 and pump 24. A portion of this stream 25 is returned to the first-effect evaporator 1 through the steam chest 6. The remaining portion is passed through line 26 to a first-effect salt separator 5 (shown in FIGURE 1). Line 27 removes fluid material from the first-effect salt separator 5 (shown in FIGURE 1) and passes it to the first-effect evaporator body 1. Line 44, conveying the output response of level controller 21, is connected to chamber A of the relay 43.

Figure 3:
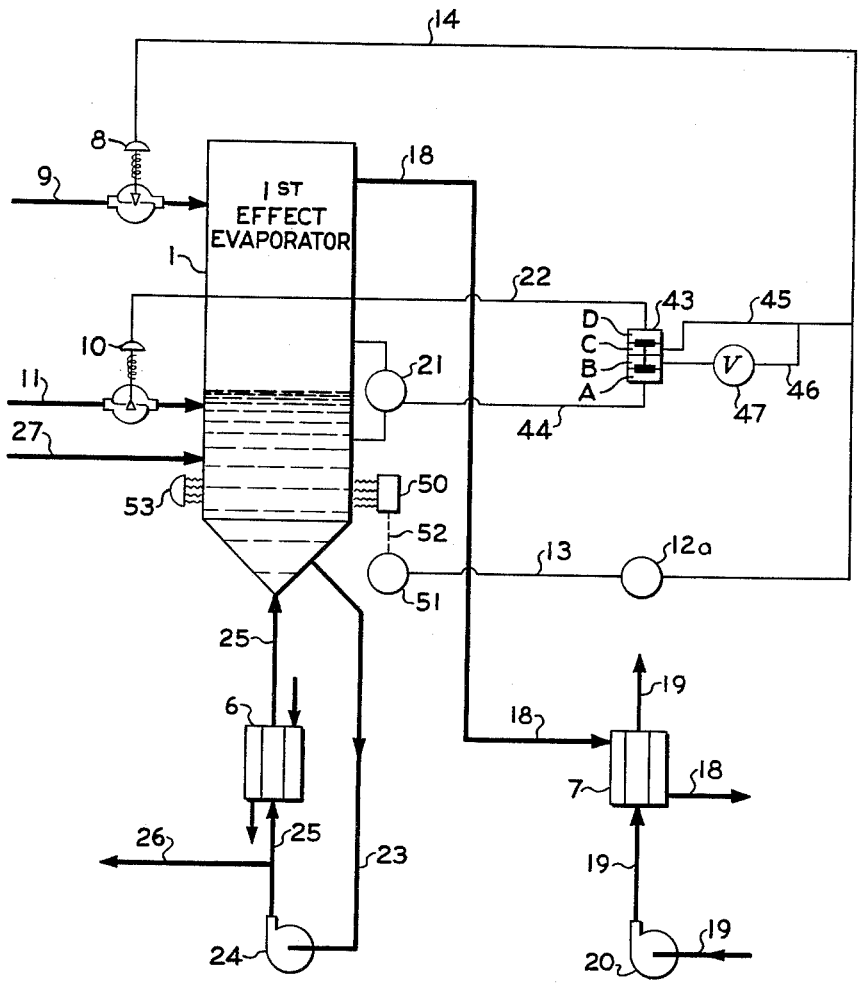

In FIGURE 3, 1 is the first-effect of a triple-effect evaporator system. 6 is a steam chest which supplies the heat energy of the material in the first-effect evaporator body 1. 7 is the steam chest of the second-effect evaporator (shown in FIGURE 1) and receives vapor from the first-effect evaporator 1. 8 is the controlled valve recirculating the fluid from the first-effect receiver 2 (shown in FIGURE 1) through line 9 to the first-effect evaporator body 1. 10 is the controlled valve feeding the fluid from the second-effect receiver 4 (shown in FIGURE 1) through line 11 to the first-effect evaporator body 1. 12a is a concentration controller receiving impulses from the transmitter 51. Line 13 is a lead from the concentration controller 12a connected to the transmitter 51 of a radiation detector and transmitter 50 and 51 respectively. The detector 50 and the transmitter 51 are connected by an electrical lead 52. The radiation detector 50 is adapted to be sensitive to changes in intensity of radiation as caused by changes in evaporator 1 fluid concentration absorbing radiation emitted from a radiation source 53. Line 14 is a lead from the concentration controller 12a connected to controlled valve 8 and the chamber C of a relay or totalizer 43 through line 45. Material from the second-effect evaporator (shown in FIGURE 1) passes through line 19 and pump 20 to the second-effect evaporator body. Concentrated material is removed from the first-effect evaporator body 1 through lines 23 and pump 24. A portion of this stream is returned to the first-effect evaporator body 1 through steam chest 6. The remaining portion is passed through line 26 to the first-effect salt separator 5 (shown in FIGURE 1) and passes to the first-effect evaporator body 1. Line 44, conveying the output response to level controller 21 is connected to chamber A of relay 43.

Figure 4:
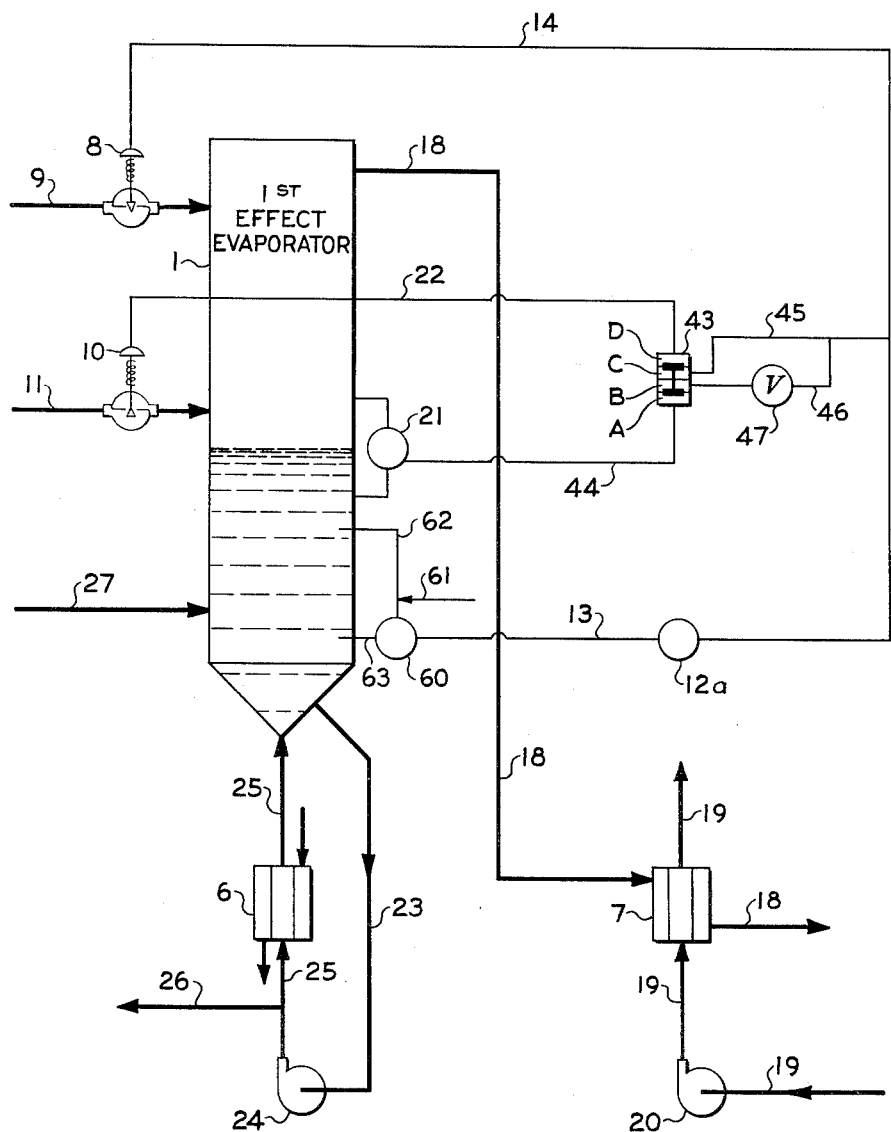

In FIGURE 4, 1 is the first-effect of the triple-effect evaporator system. 6 is the steam chest which supplies the heat energy to the material in the first-effect evaporator body 1. 7 is the steam chest of the second-effect evaporator (shown in FIGURE 1) and receives vapor from the first-effect evaporator body 1. 8 is the controlled valve recirculating the fluid from the first-effect receiver 2 (shown in FIGURE 1) through line 9 to the first-effect evaporator body 1. 10 is the controlled valve feeding the fluid from the second-effect receiver 4 (shown in FIGURE 1) through line 11 to the first-effect evaporator body 1. 12a is a concentration controller receiving impulses from a specific gravity measuring means and transmitter 60. Line 13 is a lead from the concentration controller 12a connected to the transmitter of a specific gravity measuring means and transmitter 60. The specific gravity measuring means has a water purge line 61 which provides a reference head of water on one side of its measuring element through reference leg 62. The other side of its measuring element is connected through sensing line 63 to a point lower in elevation than line 62 on the side of the evaporator whereby the said other side is subjected to the different density of the material within the evaporator. Line 14 is a lead from the concentration controller 12a connected to control valve 8 and the chamber C of a relay or totalizer 43 through line 45. Material from the second-effect evaporator (shown in FIGURE 1) passes through line 19 and pump 20 to the second-effect evaporator body. Concentrated material is removed from the first-effect evaporator body 1 through line 23 and pump 24. A portion 25 of this stream is returned to the first-effect evaporator body 1 through steam chest 6. The remaining portion is passed through line 26 to the first-effect salt separator 5 (shown in FIGURE 1). Line 27 receives fluid material from the first-effect salt separator 5 (shown in FIGURE 1) and passes it to the first-effect evaporator body 1. Line 44, conveying the output response of level controller 21, is connected to chamber A of relay 43.

Relay 43 is a totalizer or pressure responsive means, such as the commercially available Taylor 348R Transet Computing Relay, that is inserted in the output response line 44 of level controller 21 to provide an additional control function in the multiple-effect evaporation system. Line 22 is the output of chamber D of the totalizer 43 and is connected to valve 10 controlling the feed to the first-effect evaporator 1. The totalizer has four chambers; A, B, C and D, so arranged that the pressure of chamber A plus the pressure of chamber C minus the pressure of chamber B equals the pressure of chamber D, $A+C-B=D$. Line 45 in addition to being connected to chamber C is also connected to chamber B through line 46 and valve 47. The combination of chamber C, valve 47 and the volume of chamber B constitutes a means of introducing a derivative response upon control valve 10 in accordance with the rate of change of the output of concentration controller 12 or 12a. The effects of chambers B and C are equal and opposite so that during periods when the output of concentration controller 12 or 12a is not changing, the pressures in B and C will equalize through valve 47 so that the only resultant effect on valve 8 will be from the output pressure of lever controller 21 being relayed to valve 8 by the totalizer 43 action of making the pressure of its output pressure in chamber D equal to its input pressure of chamber A.

An illustrative example of the concentration controller 12 is shown diagrammatically in FIGURE 1 as an instrument which is adapted to be sensitive to changes in temperature differences between the evaporator body 1 fluid as measured by line 13 and its desuperheated vapor temperature as measured by line 15, which translates these changes into pneumatic impulses by some convenient means, such as a pivot arm. The resultant pneumatic air pressures in turn are used to automatically control the amount to which valve 8 will be open or closed through line 14. Such instruments are commercially available. Similarly, level controllers 21 and 30 are also instruments capable of measuring changes in liquid levels and translating them into pneumatic impulses by some convenient means such as a pivot arm, as is diagrammatically shown for instrument 12 in FIGURE 1.

The invention will be more fully understood by reference to the following examples which describes the manner in which the apparatus of this invention cooperate to produce the desired result.

What is desired is a "Product" from line 35 (of FIGURE 1) which is of a uniform predetermined concentration. It is also desired to maintain the liquid level and concentration in the evaporator 1 at predetermined values, depending on the desired "Product" and on the characteristics of the multiple-effect evaporation system.

If due to some process upset, such as an increase in flow rate through line 9 and valve 8, the liquid level should start to rise in the evaporator body 1, the level controller 21 output pressure falls, thereby causing valve 10 to restrict further. Since the triple-effect system is countercurrent, the fluid in line 11 from the second effect evaporator is more dilute than the liquid within the evaporator body 1. The evaporator body 1 temperature tends to increase because of the reduction in flow of dilute feed 37; thus causing an increase in temperature difference between the evaporator body 1 temperature and its desuperheated vapor temperature at 16. The concentration controller 12 senses this through the thermal elements at at ends of leads 13 and 15 respectively, and its output pressure rises causing valve 8 to restrict further, admitting less fluid from the first-effect receiver 2. This decrease in flow through valve 8 and line 9 causes the level in the evaporator body 1 to lower. Level controller 21 senses this new drop in level and reopens valve 10 to admit more fluid of lesser concentration and thus return the body conditions to the set point.

In FIGURE 1, if the temperature difference should decrease in evaporator body 1, the concentration controller 12 output pressure falls thereby causing valve 8 to open further and causing the liquid level in the evaporator body 1 to rise. The output pressure of the level controller 21 decreases thereby causing valve 10 to restrict to maintain the liquid level. Since the fluid in line 11 is weaker than the evaporator body 1 fluid, the temperature returns to the set point.

In FIGURE 2, if temperature difference should decrease in evaporator body 1, the concentration controller 12 output pressure falls, valve 8 opens further to admit more fluid and the lesser pressure applied to chamber C causes valve 10 to restrict further temporarily. This immediate decrease in the dilute feed rate helps return the temperature to the set point. However, as pressure equalizes from chamber C to chamber B through valve 47, the effect of concentration controller 12 output pressure upon valve 10 is wiped out so that the only effect remaining upon valve 10 is the output of level controller 21 as relayed through totalizer 43. However, the greater opening of valve 8 will cause the level in the evaporator body 1 to rise, and level controller 21 sensing this effect restricts valve 10 further to cause less flow of dilute feed and return the temperature to the set point.

The chambers of the totalizer 43 are so organized that the results of both the concentration controller 12 or 12a and level controller 21 are imposed upon the valve controlling flow of a fluid of lesser concentration, with the effect of the level controller 21 predominating and the effect of the concentration controller being felt during periods of temperature change and these only in a derivative manner.

From all of the foregoing description it can be seen that many advantages are derived from my control means when compared with those methods used in the past. For instance, in FIGURE 1 a method used by some manufacturers was to control concentration of first-effect 1 by connecting the output of concentration controller 12 to valve 32. Valve 8 then was connected to the output of level controller 30. By this method a three-step lag was introduced to the system. For instance, if the concentration in 1 rises; first, controller 12 opens valve 32 reducing the level in the first-effect receiver 2; second, level controller 30 senses the level drop in receiver 2 and restricts valve 8 causing level in the first-effect evaporator body 1 to fall; third, level controller 21 senses the fallen level and opens valve 10 admitting new dilute feed from the previous effect returning the concentration to the control point. Therefore, when comparing my novel two-step method of control with the above three-step example, I have found that the deviations from a given concentration set point are of shorter duration and lesser extent, thereby giving a more uniform and highly quality feed product.

It is realized that if the output of controller 12 were "tied" directly to valve 10, there would be a more improved one-step time lag. However, such a control means introduces undesirable starting-up characteristics in that considerable manual attention is required to place the evaporator 1 on stream.

It is to be understood that I do not wish to be limited to the use of a temperature difference controller to measure or control the concentration of the fluid in multiple-effect evaporator body. Any other suitable means may be used. For instance, radiation-density gauge can be used to measure the concentration of evaporator body 1 by measuring the absorptive effect of the fluid to radiation as in illustrated in FIGURE 3. Another means is to measure the specific gravity of the fluid in the evaporator 1 as is illustrated in FIGURE 4. There are several other known means of measuring concentration depending on the fluid in the evaporator and I contemplate that these means may be adaptable to my invention as well.

Likewise, I do not want to be limited to any specific totalizer, such as the Taylor relay used in FIGURE 2, because totalizers sold by other instrument companies or specially made to work on the same principles may also be used in my invention.

It is to be understood that the above-described arrangements are simply illustrative of the application of the principles of this invention. Numerous other arrangements may be readily devised for the concentration of a fluid in a multiple-effect evaporator by those skilled in the art which will employ the principles of the invention and fall within the spirit and scope thereof.

I claim:

1. A method for regulating the concentration of the product and the liquid inventory of cell liquor obtained from the electrolysis of brine being evaporated in the product-effect of a multiple effect evaporation system wherein said product-effect evaporator includes an evaporator body having a liquid level responsive means, a product concentration responsive means, a first conduit having controlled valve means for feeding to said evaporator body dilute material derived from a prior effect, a second conduit having controlled valve means for returning to said evaporator body concentrated material derived from said evaporator body, and a third conduit for withdrawing vapor evolved from said fluid in said evaporator body, which comprises: measuring the concentration of the contents of the evaporator body with the said product concentration responsive means and applying the control impulse of said product concentration responsive means to the said controlled valve means in said second conduit to effect a change in the contents of said evaporator body in a manner to decrease the contents with a body fluid concentration increase; and measuring the liquid level of the contents of the evaporator body with the said liquid level responsive means and applying the control impulse of the said liquid level responsive means to the said controlled valve means in the said first conduit to effect a change in the contents of the evaporator body in a manner to restore the contents to a predetermined level.

2. The method of claim 1 wherein the concentration of the contents of the evaporator body is measured by a product concentration responsive means sensing changes in the temperature difference between the temperature of evaporator body fluid and the temperature of the vapor being withdrawn from the said evaporator body through the said third conduit at its saturated condition at the pressure existing in the evaporator body.

3. The method of claim 1 wherein the concentration of the contents of the evaporator body is measured by a product concentration responsive means comparing the specific gravity of the evaporator body fluid with the specific gravity of water under the same hydrostatic pressure.

4. The method of claim 1 wherein the concentration of the contents of the evaporator body is measured by a product concentration responsive means sensing changes in the radiation intensity from a radiation source as caused by changes in the concentration of the contents of the evaporator body.

5. A method for regulating the concentration of the product and the liquid inventory of fluid being evaporated in the product-effect of a multiple effect evaporation system wherein said product-effect evaporator includes an evaporator body having a liquid level responsive means, a product concentration responsive means, a pressure responsive means having two inputs, one of which is in communication with the output response line of the said product concentration responsive means, a first conduit having controlled valve means for feeding to said evaporator body dilute material derived from a prior effect, a second conduit having controlled valve means for returning to said evaporator body concentrated material derived from said evaporator body, and a third conduit for withdrawing vapor evolved from said fluid in said evaporator body, which comprises: measuring the concentration of the contents of the evaporator body with the said product concentration responsive means and applying the control impulse of said product concentration responsive means to the said controlled valve means in said second conduit to effect a change in the contents of said evaporator body in a manner to decrease the contents with an evaporator body fluid concentration increase; and measuring the level of the contents of the evaporator body with the said liquid level responsive means and applying the control impulse of the said liquid level responsive means to the other of said inputs of said pressure responsive means, applying the control impulse of said pressure responsive means to the said controlled valve means in the said first conduit, whereby the controlled valve means in said first conduit is responsive to variations in both the concentration and the level of the evaporator fluid to effect a change in the contents of the evaporator body in a manner to restore the contents to a predetermined level.

6. The method of claim 5 wherein the fluid being evaporated is cell liquor obtained from the electrolysis of brine.

7. The method of claim 5 wherein the concentration of the contents of the evaporator body is measured by a product concentration responsive means sensing changes in the temperature difference between the temperature of evaporator body fluid and the temperature of the vapor being withdrawn from the said evaporator body through the said third conduit at its saturated condition at the pressure existing in the evaporator body.

8. The method of claim 5 wherein the concentration of the contents of the evaporator body is measured by a product concentration responsive means comparing the specific gravity of the evaporator body fluid with the specific gravity of water under the same hydrostatic pressure.

9. The method of claim 5 wherein the concentration of the contents of the evaporator body is measured by a product concentration responsive means sensing changes in the radiation intensity from a radiation source as caused by changes in the concentration of the contents of the evaporator body.

10. A method for regulating the concentration of the product and the liquid inventory of cell liquor obtained from the electrolysis of brine being evaporated in the product-effect of a multiple effect evaporation system wherein said product-effect evaporator includes an evaporator body and external recirculation means, said external recirculation means having a receiver for receiving concentrated fluid derived from said evaporator body said receiver having liquid level responsive means and a conduit having controlled valve means for withdrawing clarified product therefrom, and said evaporator body having a liquid level responsive means, a product concentration responsive means, a first conduit having controlled valve means for feeding to said evaporator body dilute material derived from a prior effect, a second conduit having controlled valve means for returning to said evaporator body concentrated material derived from said evaporator body through said receiver and a third conduit for withdrawing vapor evolved from said fluid in said evaporator body and being in communication with a desuperheating chamber, which comprises: measuring the concentration of the contents of the evaporator body by the said product concentration responsive means sensing changes in the temperature difference between the temperature of the evaporator body fluid and the temperature of the vapor in its saturated condition in the said desuperheater at the pressure existing in the evaporator body and applying the control impulse of said product concentration responsive means to the said controlled valve means in said second conduit to effect a change in the contents of said evaporator body in a manner to decrease the contents with a body fluid concentration increase; and measuring the liquid level of the contents of the evaporator body with the said liquid level responsive means and applying the control impulse of the said liquid level responsive means to the said controlled valve means in the said first conduit to effect a change in the contents of the evaporator body in a manner to restore the contents to a predetermined level, measuring the liquid level of the contents of said receiver with the said liquid level responsive means and applying the control impulse of its said liquid level responsive means to the said controlled valve means in said receiver withdrawal conduit, whereby excess clarified concentrated fluid from the receiver is withdrawn as product through the said withdrawal conduit.

11. A method for regulating the concentration of the product and the liquid inventory of fluid being evaporated in the product-effect evaporator of a multiple effect evaporation system wherein said product-effect evaporator includes an evaporator body and external recirculation means, said external recirculation means having a receiver for receiving concentrated fluid derived from said evaporator body, said receiver having liquid level responsive means and a conduit having controlled valve means for withdrawing clarified product therefrom, and said evaporator body having a liquid level responsive means, a product concentration responsive means, a pressure responsive means having two inputs one of which is in communication with the output response line of the said product concentration responsive means, a first conduit having controlled valve means for feeding to said evaporator body dilute material derived from a prior effect, a second conduit having controlled valve means for returning to said evaporator body concentrated material derived from said evaporator body through said receiver and a third conduit for withdrawing vapor evolved from said fluid in said evaporator body and being in communication with a desuperheating chamber, which comprises: measuring the concentration of the contents of the evaporator body by the said product concentration responsive means sensing changes in the temperature difference between the temperature of the evaporator body fluid and the temperature of the vapor in its saturated condition in the said desuperheater at the pressure existing in the evaporator body and applying the control impulse of said product concentration responsive means to the said controlled valve means in said second conduit to effect a change in the contents of said evaporator body in a manner to decrease the contents with a concentration increase; and measuring the liquid level of the contents of the evaporator body with the said liquid level responsive means and applying the control impulse of the said liquid level responsive means to the other of said inputs of said pressure responsive means; applying the control impulse of said pressure responsive means to the said controlled valve means in the said first conduit, whereby the controlled valve means in said first conduit is responsive to variations in both the concentration and the level of the evaporator fluid to effect a change in the contents of the evaporator in a manner to restore the contents to a predetermined level, measuring the liquid level of the contents of said receiver with the said receiver liquid level responsive means and applying the control impulse of its said liquid level responsive means to the said controlled valve means in said receiver withdrawal conduit, whereby excess clarified concentrated fluid from the receiver is withdrawn as product through the said withdrawal conduit.

References Cited in the file of this patent

UNITED STATES PATENTS

| | | |
|---|---|---|
| 378,843 | Lillie | Feb. 28, 1888 |
| 559,857 | Lillie | May 12, 1896 |
| 2,073,825 | Beck et al. | Mar. 16, 1937 |
| 2,135,512 | Holven | Nov. 8, 1938 |
| 2,199,214 | Vorkauf | Apr. 30, 1940 |
| 2,287,995 | Haugh | June 30, 1942 |
| 2,304,150 | Crawford | Dec. 8, 1942 |
| 2,745,484 | Eckstrom et al. | May 15, 1956 |
| 2,850,086 | Sanscrainte | Sept. 2, 1958 |
| 2,931,433 | Mertz | Apr. 5, 1960 |
| 2,954,821 | Baumann et al. | Oct. 4, 1960 |